United States Patent [19]
Gakhar et al.

[11] Patent Number: 5,622,462
[45] Date of Patent: Apr. 22, 1997

[54] TWIST DRILL BIT

[75] Inventors: Ved Gakhar; David T. Brutscher; Wilfred M. McCord, Jr., all of Louisville, Ky.

[73] Assignee: Credo Tool Company, Woodburn, Oreg.

[21] Appl. No.: 420,053

[22] Filed: Apr. 11, 1995

[51] Int. Cl.⁶ .................................................. B23B 51/02
[52] U.S. Cl. .......................................... 408/230; 408/715
[58] Field of Search .................................... 408/229, 230, 408/715, 227

[56] References Cited

U.S. PATENT DOCUMENTS

| | | |
|---|---|---|
| 750,537 | 1/1904 | Hanson . |
| 1,407,546 | 2/1922 | Joseph . |
| 2,204,030 | 6/1940 | Say . |
| 2,646,701 | 12/1953 | Letien . |
| 2,769,355 | 11/1956 | Crisp . |
| 4,802,799 | 2/1989 | Rachev . |
| 4,871,287 | 10/1989 | Hougen . |
| 4,984,944 | -1/1991 | Pennington, Jr. et al. . |
| 5,038,642 | 8/1991 | Alverio et al. . |
| 5,160,232 | 11/1992 | Maier . |

FOREIGN PATENT DOCUMENTS

| | | | |
|---|---|---|---|
| 0278288 | 8/1988 | European Pat. Off. | 408/230 |
| 0318208 | 12/1988 | Japan | 408/230 |
| 0005708 | 1/1989 | Japan | 408/230 |

*Primary Examiner*—Steven C. Bishop
*Attorney, Agent, or Firm*—Middleton & Reutlinger; Charles G. Lamb

[57] ABSTRACT

A drill bit is provided with a pair of spiral cutting blades having opposed cutting edges which come together at an angle to form a starting tip. Each of the spiral cutting blades includes a spiral flute which extends longitudinally thereof and is provided with a cutting face thereon. Each cutting edge is provided with an inner edge segment and an outer edge segment wherein the inner edge segment extends outwardly from the starting tip a preselected distance and terminates at an inwardly extending inner wall portion of a gullet. The inner wall portion of the gullet is arcuate in structure and terminates at a preselected inward position with an outer wall of the gullet. The outer wall of the gullet extends angularly outwardly terminating at the intersection with an outer segment of the cutting edge. The outer edge segment of the cutting edge is defined by the outward terminating end of the outer wall of the gullet and the outer most extremity of the cutting edge.

4 Claims, 1 Drawing Sheet

TWIST DRILL BIT

BACKGROUND OF THE INVENTION

1. Field of the Invention

This invention relates to drills and drill bits and in particular to the construction of drill bits with improved efficiency in the removal of discharging chips in the cutting of holes in a workpiece.

2. Discussion of the Prior Art

In the manufacture of drill bits for the cutting of holes in metals and woods, one of the problems encountered is the removal of chips which are obtained through the cutting process. In many cases the chips, which are being removed during drilling, can cause binding of the drill bit therefore requiring the drill to be shut off, and the drill bit removed from the hole. The hole then has to be cleaned out of the chips before the drill bit can be re-inserted and the drilling restarted. This stopping and restarting results in a very inefficient drilling or cutting process.

A number of prior art references teach a number of different types of drill bits which have been constructed to eliminate or at least improve the efficiency of the removal of chips during the drilling of holes in metals, woods and the like. For example, U.S. Pat. No. 2,769,355 teaches a fluted cutting tool which provides for the breaking up of the material drilled by the drill bit or cutting tool into small pieces to facilitate the clearing of the material from the flute. However, it has been found that the breaking up of the material into small chips during the cutting process is not desirable. It has been found that efficiency is improved and less down time is needed if the drill bit is constructed so that the chip coming out of the cutting process is not in small pieces but is in a long sustained curl.

SUMMARY OF THE INVENTION

The present invention is directed to a drill bit which, when cutting, provides a continuous chip. Further, the present invention is directed to a drill bit which has improved stabilizing effect and is easier to hold when in operation. Even further, the present invention provides a drill within a drill cutting tool wherein the drill bit profile remains intact even after resharpening thereby improving the length of service for the drill bit. And, the present invention is directed to a drill bit which gives cleaner holes.

More particularly, the present invention provides a drill bit comprising a pair of spiral cutting blades having opposed cutting edges joined together at an angle to form a starting tip. Each spiral cutting blade includes a spiral flute which extends longitudinally thereof and is provided with a cutting face thereon. The cutting edges have an inner edge and an outer edge wherein the inner edge extends outwardly from the starting tip a preselected distance and terminates at an inwardly extending inner wall of a gullet. The inner wall portion of the gullet is arcuate in structure and terminates at a preselected inward position with an outer wall of the gullet. The outer wall of the gullet extends angularly outwardly terminating at the intersection with the cutting edge. An outer edge of the cutting edge is defined by the outward terminating end of the outer wall of the gullet and the outermost extremity of the cutting edge.

BRIEF DESCRIPTION OF THE DRAWINGS

The objects, features and advantages of the invention will become readily apparent from the following written description and from the drawings in which.

DESCRIPTION OF THE PREFERRED EMBODIMENT

Figure 1:
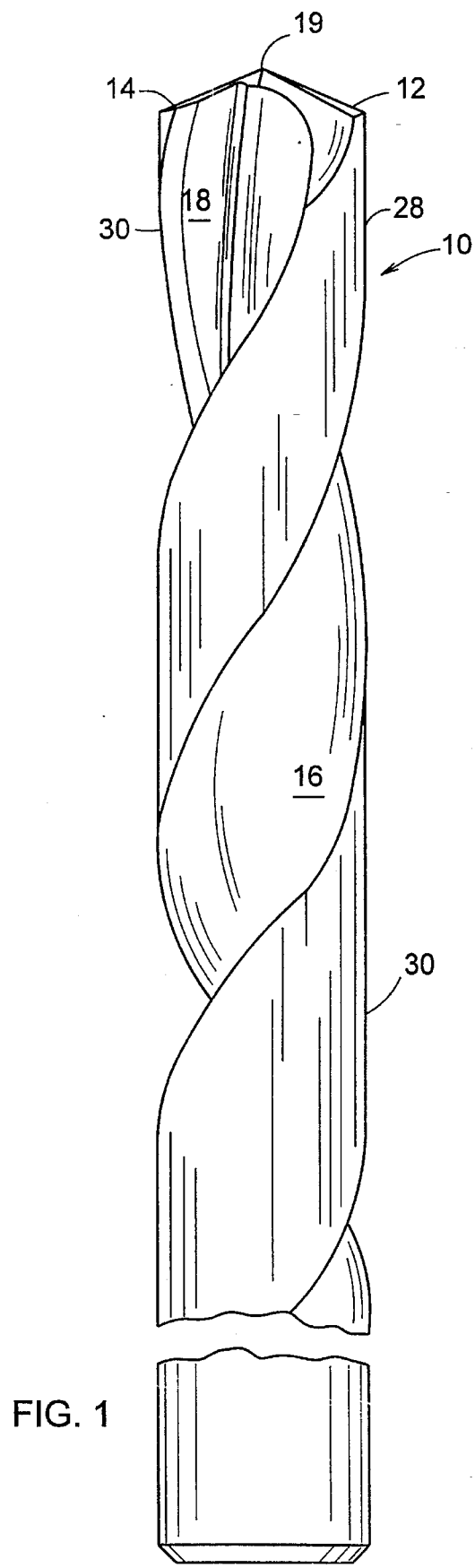
FIG. 1 is a side view of the drill of the present invention.
Figure 2:
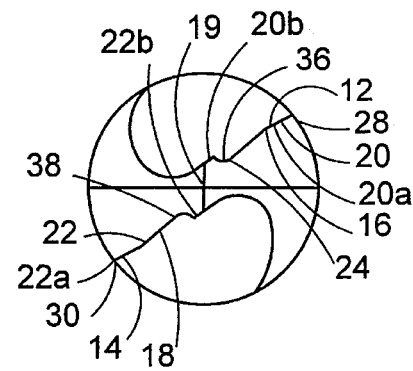
FIG. 2 is an end view of the drill of FIG. 1.

In FIGS. 1 and 2 a fluted cutting drill 10 is shown wherein the drill 10 includes two cutting blades 12 and 14 with a split tip 19 connecting the two cutting blades 12 and 14. The spiral form of the blades 12 and 14 forms the flutes 16 and 18 therebetween.

The cutting blades 12 and 14, are provided with cutting edges 20, 22, respectively, which extend inwardly from the outer edges 28, 30, respectively. Gullets 36, 38, respectively, are provided in each cutting edge 20, 22.

Figure 3:
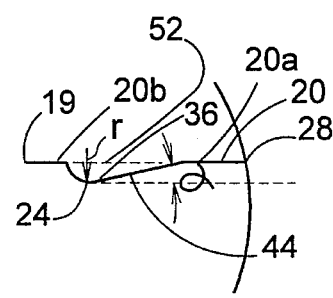
FIG. 3 is an enlarged end view of one section of FIG. 2.

Cutting blades 12, 14 are mirror images of each other and as shown in FIG. 3, the gullet 36 is defined by inner wall portion 24 at its innermost position and by the outer wall 44 at its outermost position. The inner wall portion 24 is generally of arcuate structure with the radius of curvature of the arc defining the depth of the gullet 36. That is, the arcuate inner wall portion 24 terminates at the innermost position. The outer wall portion 44 is linear and extends angularly outwardly terminating at the intersection with the cutting edges 20. As best shown in FIG. 3, outer wall portion 44 extends angularly outwardly terminating with the cutting line segment 52 of cutting edge 20. Generally, the length of the outer wall portion 44 of the gullet 36 is defined by the angle $\alpha$. The angle $\alpha$ is generally from about 6° to 20° and preferably from 10° to 12°.

Cutting edges 20, 22 are provided with outer cutting edges 20a, 22a, respectively, and inner cutting edges 20b, 22b, respectively, with the gullets 36, 38 therebetween outer cutting edge 20a is in axial alignment with inner cutting edge 20b and outer cutting edge 22a is in axial alignment with inner cutting edge 22b. Gullets 36, 38 extend longitudinally along the drill 10 a preselected distance less than the total length of drill 10.

In operation, as the drill 10 rotates, the cutting edges 20, 22 cut into a work piece with the cut chip forming a "curl" within the gullets 36, 38. As the drill 10 is used several times, the cutting edges 20, 22 become dull, abrade, chip and the like. However, since the gullets 36, 38 extend longitudinally along the drill 10, the drill cutting edges 20, 22 can be sharpened several times without destroying the gullets 36, 38. The geometry of the gullets 36, 38 remain intact after a number of re-sharpenings. Thus, by being able to re-sharpen the drill 10 significantly increases the longevity of the life of the drill 10 without interfering with the cutting ability of the drill over drills which are not susceptible to re-sharpening or can only be re-sharpened one or two times.

Even though only one embodiment has been shown and described in the present application, it is realized that various modifications may be made to the preferred embodiment without departing from the scope and spirit of the present invention.

What is claimed is:

1. A drill comprising:

a pair of spiral cutting blades having opposed outer edges with inwardly extending cutting edges joined together at an angle to form a starting tip;

said pair of spiral cutting blades define a pair of longitudinally extending spiral flutes therebetween;

each of said cutting edges having an inner edge segment and an outer edge segment with a gullet disposed between said inner edge segment and said outer edge segment, said inner edge segment and said outer edge segment of each said cutting edge being in axial alignment; and, said gullet having an arcuate inner wall and an angularly disposed linearly extending outer wall, said inner wall terminating at one end with said inner edge segment and said outer wall at an opposite end, said outer wall connecting said inner wall to said outer edge segment.

2. The drill of claim 1 wherein the depth of said gullet is approximately equal to the radius of curvature of said inner wall.

3. The drill of claim 1 wherein the angle of said outer wall to said cutting edge is from 6° to 20°.

4. The drill of claim 3 wherein said angle is from 10° to 12°.

* * * * *